(12) United States Patent
Ishihara

(10) Patent No.: US 11,882,250 B2
(45) Date of Patent: Jan. 23, 2024

(54) IMAGE SCANNING DEVICE

(71) Applicant: Konica Minolta, Inc., Tokyo (JP)

(72) Inventor: Keita Ishihara, Hino (JP)

(73) Assignee: Konica Minolta, Inc., Tokyo (JP)

( * ) Notice: Subject to any disclaimer, the term of this patent is extended or adjusted under 35 U.S.C. 154(b) by 396 days.

(21) Appl. No.: 17/462,831

(22) Filed: Aug. 31, 2021

(65) Prior Publication Data

US 2022/0070312 A1 Mar. 3, 2022

(30) Foreign Application Priority Data

Aug. 31, 2020 (JP) ................................ 2020-146224

(51) Int. Cl.
*H04N 1/08* (2006.01)
*H04N 1/00* (2006.01)
*H04R 1/08* (2006.01)
*G10L 15/22* (2006.01)

(52) U.S. Cl.
CPC ......... *H04N 1/00403* (2013.01); *G10L 15/22* (2013.01); *H04R 1/083* (2013.01); *G10L 2015/223* (2013.01)

(58) Field of Classification Search
CPC ............................ H04N 1/00403; G10L 15/22
See application file for complete search history.

(56) References Cited

U.S. PATENT DOCUMENTS 5,884,249 A * 3/1999 Namba ................. G06F 40/268
704/275
2020/0177745 A1* 6/2020 Ishida ..................... G10L 15/26

FOREIGN PATENT DOCUMENTS

JP 2011-119815 12/2009

* cited by examiner

*Primary Examiner* — Ibrahim Siddo
(74) *Attorney, Agent, or Firm* — BakerHostetler

(57) ABSTRACT

An image scanning device may comprise a microphone for receiving a voice, an image scanning section for scanning an image, and a control section for instructing the image scanning section to start scanning after a delay time elapses after the voice. The image scanning device may be able to scan a copy sheet, without being affected by an air flow caused by a voice when instructed to scan the copy sheet with a voice instruction.

18 Claims, 6 Drawing Sheets

FIG. 3

| No. | Copy Sheet Cover | Start Instruction | Face Direction | Distance | Sound Volume | Uttering Speed | Scanning Start Delay Control |
|---|---|---|---|---|---|---|---|
| 1 | Not fixed | Voice Instruction | Front Direction | Short | Medium | Medium Speed | 4 sec delay |
| 2 | Not fixed | Voice Instruction | Front Direction | Short | Medium | High Speed | 2 sec delay |
| 3 | Not fixed | Voice Instruction | Front Direction | Short | Large | High Speed | 1 sec delay |
| 4 | Not fixed | Voice Instruction | Front Direction | Very Short | Large | High Speed | 0.5 sec delay |
| 5 | Fixed | Voice Instruction | Front Direction | Short | Medium | High Speed | No delay (Immediate Start) |
| 6 | Not fixed | Voice Instruction | Different Direction | Short | Medium | Medium Speed | No delay (Immediate Start) |
| 7 | Not fixed | Voice Instruction | Front Direction | Long | Medium | Medium Speed | No delay (Immediate Start) |
| 8 | Not fixed | Voice Instruction | Front Direction | Short | Small | Medium Speed | No delay (Immediate Start) |
| 9 | Not fixed | Voice Instruction | Front Direction | Short | Medium | Low Speed | No delay (Immediate Start) |
| 10 | Not fixed | Ordinary Instruction (Depress Button) | — | — | — | — | No delay (Immediate Start) |
| 11 | Fixed | Ordinary Instruction (Depress Button) | — | — | — | — | No delay (Immediate Start) |

ST

Distance
Very Short···< 0.3 m
Short···0.3 ~ 0.5 m
Long···0.5 m ≤

Sound Volume
Large···70 dB ≤
Medium···30 ~ 70 dB
Small···< 30 dB

Uttering Speed
High Speed···10 vowels/sec ≤
Medium Speed···3 ~ 10 vowels/sec
Low Speed···< 3 vowels/sec

IMAGE SCANNING DEVICE

CROSS REFERENCE TO RELATED APPLICATIONS

This application claims priority to Japanese Patent Application No. 2020-146224 filed on Aug. 31, 2020, the disclosure of which is incorporated herein by reference in its entirety.

TECHNICAL FIELD

The present disclosure relates to an image scanning device to operate by a voice instruction with a copy sheet being not fixed.

BACKGROUND

Efforts have been made to develop a voice instruction process for image scanning. The voice instruction means, for example, having scanning performed in accordance with a voice instruction to instruct that scanning should be started without depressing an operation button of the image scanning device.

When the voice instruction is given to the image scanning device with its copy sheet cover kept open, an air flow caused by a voice uttered by a user reaches the copy sheet after a certain delay time elapses. In this case, there is a problem with the copy sheet being displaced by the air flow that reaches the copy sheet while scanning is being performed after scanning is started.

There has been an image forming device that is related to this kind of the image scanning device. For instance, JP2011-119815A discloses an image forming device that can obtain a copied material as desired even if the copy sheet is displaced.

JP2011-119815A describes as a means to achieve the objective "the detecting section detects a position on a platen glass table 14 at which a copy sheet is placed while the displaying section displays the position on the platen glass table 14 at which the copy sheet is placed. Then, until scanning is started, the detecting section is controlled to keep on detecting the position at which the copy sheet is placed at constant intervals and the displaying section is controlled to display a latest position at which the copy sheet is placed if the latest position detected by the detecting section differs from a prior position at which the copy sheet is placed, the prior position being detected just before the latest position is detected."

However, if the voice instruction is given to the image forming device disclosed by JP2011-119815A, scanning is started as soon as the voice instruction is received. Then, if a copy sheet cover is kept open, the air flow caused by the voice instruction reaches the copy sheet after a certain delay time. As a result, the scanned image is displaced such that a part of the copy sheet being not scanned, or the scanned image is blurred.

SUMMARY

Taking the above mentioned into consideration, the present disclosure has an objective to create an image forming device with which a copy sheet is appropriately scanned without the air flow caused by the voice instruction having an influence on the scanning operation when the scanning operation is instructed with the voice instruction.

The objective of the present disclosure is achieved by the following image scanning devices with configurations as described below. An image scanning device comprising: a voice receiving section for receiving a voice; an image scanning section for scanning an image; and a control section for instructing the image scanning section to start scanning after a delay time elapses after the voice if the control section determines that the voice received by the voice receiving section corresponds to an instruction for starting scanning.

The described image scanning device, further comprising a determining section to determine whether a copy sheet is fixed on the image scanning section, wherein if the control section determines that the voice received by the voice receiving section corresponds to the instruction for starting scanning and the determining section determines that the copy sheet is fixed on the image scanning section, the control section immediately instructs the image scanning section to start scanning.

The described image scanning device, further comprising an imaging section for taking an image of a user operating the image scanning device, wherein if the control section determines that a user's face does not face the image scanning section based on the image taken by the imaging section of the user and that the voice received by the voice receiving section corresponds to the instruction for starting scanning, the control section immediately instructs the image scanning section to start scanning.

The described image scanning device, further comprising a distance sensor to detect a distance to the user who is operating the image scanning device, wherein if the control section determines that the distance to the user is equal to or longer than a predetermined distance and that the voice received by the voice receiving section corresponds to the instruction for starting scanning, the control section immediately instructs the image scanning section to start scanning. The described image scanning device, wherein, if the control section determines that the distance to the user is shorter than the predetermined distance and that the voice received by the voice receiving section corresponds to the instruction for starting scanning, the control section instructs the image scanning section to start scanning after a delay time that corresponds to the distance to the user elapses.

The described image scanning device, wherein, if the control section determines that a sound volume of the voice received by the voice receiving section is equal to or smaller than a predetermined value and that the voice received by the voice receiving section corresponds to the instruction for starting scanning, the control section immediately instructs the image scanning section to start scanning.

The described image scanning device, wherein, if the control section determines that an uttering speed of the voice by a user is equal to or lower than a predetermined value and that the voice received by the voice receiving section corresponds to the instruction for starting scanning, the control section immediately instructs the image scanning section to start scanning.

The described image scanning device, wherein, if the control section determines that the voice received by the voice receiving section corresponds to the instruction for starting scanning, the control section determines the delay time after which scanning is started based on the sound volume of the voice.

The described image scanning device, wherein, if the control section determines that the voice received by the voice receiving section corresponds to the instruction for starting scanning, the control section determines the delay time after which scanning is started based on the uttering speed of the voice uttered by the user.

The described image scanning device, further comprising a display section, wherein the control section notifies the user with display section that scanning is being delayed during a time from the voice for instructing that scanning should be started to when the image scanning section starts scanning.

The described image scanning device, wherein, if the control section determines that the voice receiving section receives a voice for instructing that scanning should stop during a time from the voice for instructing that scanning should be started to when the image scanning section starts scanning, the control section does not instruct the image scanning section to start scanning.

The described image scanning device, wherein the control section instructs the image scanning section to scan again if the control section determines that a scanned image is blurred when the image scanning section performs scanning after the delayed time elapses after the voice for instructing that scanning should be started.

The described image scanning device, wherein the control section asks a user if scanning is performed again, if the control section determines that quality of a scanned image is not good when the image scanning section performs scanning after the delayed time elapses after the voice for instructing that scanning should be started.

The described image scanning device, wherein the control section asks a user to lower a sound volume of the voice uttered by the user, if the determining section determines that the copy sheet is not fixed when the voice receiving section receives the voice uttered by the user.

The described image scanning device, wherein the control section asks a user to lower an uttering speed, if the determining section determines that the copy sheet is not fixed when the voice receiving section receives the voice uttered by the user.

The described image scanning device, wherein the control section asks a user to turn away a user's face from the image scanning section, if the determining section determines that the copy sheet is not fixed when the voice receiving section receives the voice uttered by the user.

The described image scanning device, wherein the control section asks a user to move farther away from the image scanning section, if the determining section determines that the copy sheet is not fixed when the voice receiving section receives the voice uttered by the user.

The described image scanning device, wherein, if an instruction for to starting scanning is given with an operation button, the control section immediately instructs the image scanning section to start scanning.

The present disclosure enables scanning being appropriately performed by the image scanning section without being influenced by an air flow caused by a voice being uttered by a user when the image scanning section is instructed to start scanning with a voice instruction.

BRIEF DESCRIPTION OF THE DRAWINGS

FIG. 3 is a table showing how a control section of the image scanning device controls a delay time after which scanning is started.

DETAILED DESCRIPTION OF EMBODIMENTS

Hereinafter, an embodiment for practicing the present invention is described in detail. The embodiment described below is an example for practicing the present invention and may be modified appropriately or altered depending on a configuration and a condition of a device to which the present invention is applied. The present disclosure should not be limited to the embodiment described below. Furthermore, parts of various embodiments described later may be combined to constitute an example for practicing the present invention.

Embodiment

[Total Configuration of Image Scanning Device]

Figure 1:
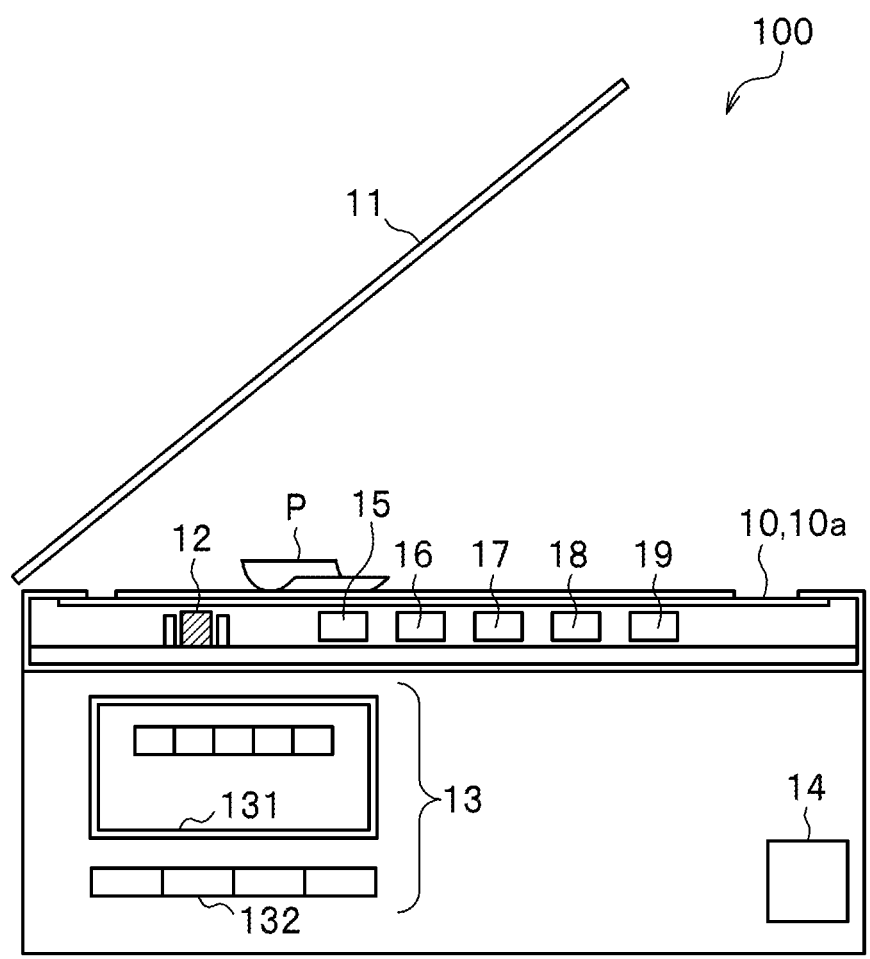
FIG. 1 schematically illustrates a total configuration of an image scanning device of an embodiment.

FIG. 1 illustrates a total configuration of an image scanning device 100 of the embodiment. As shown in FIG. 1, the image scanning device 100 of the embodiment may comprise a platen copy sheet table 10, a copy sheet cover 11, a scanning section 12, an operation panel 13, a control section 14, a microphone 15, an open-close sensor 16, a distance sensor 17, a light emitting section 18 and a camera 19. The image scanning device 100 may be constituted by, for example, a scanner.

The platen copy sheet table 10 includes a platen glass plate 10a. After a copy sheet P is placed on the platen glass plate 10a, the scanning section 12 performs a scanning operation to scan an image of the copy sheet P. One example of the copy sheet P is a receipt.

The copy sheet cover 11 is sized to fully cover the platen glass plate 10a of the platen copy sheet table 10. In order to scan an image of the copy sheet P with the image scanning device 100, either a sheet-through method or a platen-set method may be taken. In the case of the sheet-through method, an image of each of plural copy sheets P is scanned one-by-one while the plural copy sheets P are transferred on a slit glass plate. In the case of the platen-set method, an image of the copy sheet P that is placed on the platen glass plate is scanned. In order to scan the image of the copy sheet P, the image of the copy sheet P may be scanned either with the copy sheet cover 11 placed over the copy sheet P or without the copy sheet cover 11 over the copy sheet P. When the image of the copy sheet P is scanned without the copy sheet cover over the copy sheet P, this image scanning method is called "Sky Shot".

The scanning section (image scanning section) 12 may be configured to scan an image of the copy sheet P that is placed on the platen glass plate 10a. The scanning section 12 may include a light source (not shown) and is configured to radiate light from under the platen glass plate 10a and receive a reflected light from the platen glass plate 10a.

The operation panel 13 may be an input device which a user operates to have the image scanning device 100 perform various operations. The operation panel 13 may include a touch panel 131 and/or hard keys 132, and may be used to set such functions for operation as copying, scanning, FAX and deleting outside the copy sheet.

Figure 2:
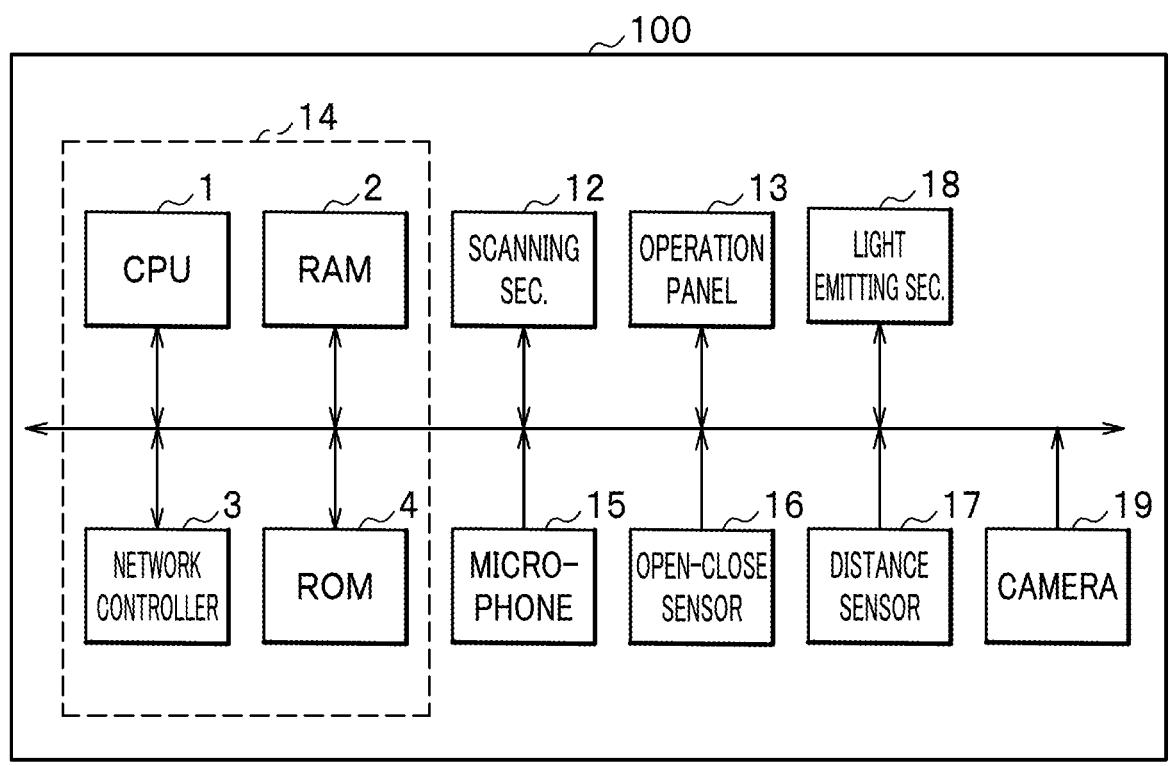
FIG. 2 shows a block diagram showing a configuration of hardware devices of the image scanning device of the embodiment.

As shown in FIG. 2, the control section 14 may include a CPU (Central Processing Unit) 1, a RAM (Random Access Memory) 2, a Network controller 3 and a ROM (Read Only Memory) 4.

FIG. 2 is a block diagram showing a configuration of hardware devices of the image scanning device 100 of the embodiment. An element that is shown in the block diagram in FIG. 2 as well as in FIG. 1 is assigned an identical sign and a duplicate description is omitted on it.

The CPU 1 of the control section 14 may be configured to read and execute any of programs stored in the ROM 4 to perform any of the functions (such as copying, scanning, FAX and deleting outside the copy sheet). The ROM 4 is configured to store a control program to control the image scanning device 100. The RAM 2 may be, for example, DRAM (Dynamic Random-Access Memory) and function as a working memory to temporarily store data that are needed for the CPU 1 to execute a control program.

The network controller 3 may include a network interface section. The network controller 3 may be configured to connect the image scanning device 100 with such a network as LAN (Local Area Network). The CPU 1 may be configured to receive data from an external device connected with the network and sending data to the external device through the network controller 3.

With reference to FIG. 1, the image scanning device 100 is further described.

The microphone (voice receiving section) 15 may receive a voice uttered by a user. The microphone 15 receives a voice uttered by a user and sends voice data corresponding to the received voice to the control section 14. The control section 14 may receive the voice data and convert the voice data to a character string. The control section 14 may be configured to recognize what the user has instructed the control section 14 to carry out based on the converted character string. That is, the control section 14 may recognize an event that has happened. If the voice that is uttered by the user and received by the microphone 15 indicates an instruction for starting scanning, the control section 14 instructs the scanning section 12 to start scanning.

For instance, if the voice that the microphone 15 has received corresponds to "Start scanning", "perform scanning", or "Delete outside the copy sheet", the control section 14 instructs the scanning section 12 to start scanning.

The open-close sensor (determining section) 16 may be configured to determine if the copy sheet P is fixed at the scanning section 12. In the case of this embodiment, the open-close sensor 16 detects, for example, if the copy sheet cover 11 to be placed over the platen glass plate 10a of the platen copy sheet table 10 is closed or not. If the control section 14 determines that the voice that the microphone 15 has received corresponds to the instruction for starting scanning when the open-close sensor detects the copy sheet cover 11 being left open, then the control section 14 determines that the copy sheet P is not fixed on the copy sheet table 10 and instructs the scanning section 12 to start scanning the copy sheet P after a predetermined delay time elapses after the voice. If the control section 14 determines that the voice that the microphone 15 has received corresponds to the instruction for starting scanning when the open-close sensor detects the copy sheet cover 11 being not open, then the control section 14 determines that the copy sheet P is fixed on the platen copy sheet table 10 and immediately instructs the scanning section 12 to start scanning the copy sheet P without a delay.

The distance sensor 17 may be configured to detects a distance to a user who is operating the image scanning device 100. If the control section 14 determines that the voice that the microphone 15 has received corresponds to the instruction for starting scanning when the distance detected by the distance sensor 17 is less than a predetermined distance, then the control section instructs the scanning section 12 to start scanning the copy sheet P after the predetermined delay time elapses after the voice. If the control section 14 determines that the voice that the microphone 15 has received corresponds to the instruction for starting scanning when the distance detected by the distance sensor 17 is equal to or more than the predetermined distance, then the control section 12 instructs the scanning section 12 to start scanning the copy sheet P immediately after the voice is received. The predetermined distance may be set to, for example, 0.5 m or a longer distance.

The camera 19 may be configured to take an image of the user who is operating the image scanning device 100. The control section 14 may determine a direction which a user's face faces based on the image taken by the camera 19 of the user. If the control section 14 determines that the voice that the microphone 15 has received corresponds to the instruction for starting scanning and that the user's face faces the scanning section 12, then the control section 14 instructs the scanning section 12 to start scanning after the predetermined delay time elapses after the voice. If the control section 14 determines that the voice that the microphone 15 has received corresponds to the instruction for starting scanning and that the user's face does not face the scanning section 12, then the control section 14 instructs the scanning section 12 to start scanning immediately after the voice is received.

The light emitting section 18 may be a part of the display section. When the control section 14 instructs the scanning section 12 to start scanning after the predetermined delay time elapses, the light emitting section (display section) 18 to emit light during a time from the voice instruction for starting scanning to when scanning is started to notify the user of the scanning operation being delayed. The light emitting section 18 is formed by, for example, LED (Light Emitting Diode).

The control section 14 of the image scanning device 100 of the embodiment may determine whether the scanning operation is delayed or not based on (1) a state of the copy sheet cover 11, (2) a direction that the user's face faces, (3) a distance between the scanning section 12 and the user, (4) a sound volume of the voice that the user utters, and (5) a speed at which the user is uttering words.

FIG. 3 is a scanning start delay control table showing how the control section 14 of the image scanning device 100 controls the delay time after which scanning is started.

As shown in FIG. 3, the scanning start delay control table ST includes eleven different scanning operation starting patterns as examples. The scanning start delay control table ST includes columns for "Number", "Copy Sheet Cover", "Start Instruction", "Face Direction", "Distance", "Sound Volume", "Uttering Speed" and "Scanning Start Delay Control".

The column for "Number" indicates a number assigned to each of the eleven scanning operation delay control patterns. The column for "Copy Sheet Cover" is filled with "Not fixed" when the copy sheet cover 11 is left open and filled with "Fixed" when the copy sheet cover 11 is closed. The column for "Start Instruction" is filled with either "Voice Instruction" or "Ordinary Instruction" (Depressing a button) to instruct the scanning operation. The column for "Face Direction" is filled with either "Front Direction" or "Different direction".

The column for "Distance" is filled with one of "Very Short", "Short", and "Long". To be specific, the column is filled with "Very Short" if the distance is shorter than 0.3 m, is filled with "Short" if the distance is equal to or longer than 0.3 m and shorter than 0.5 m, and is filled with "Far" if the distance is equal to or longer than 0.5 m.

The column for "Sound Volume" is filled with one of "Large", "Medium", and "Small". To be specific, this column is filled with "Large" if the sound volume is equal to or larger than 70 dB, is filled with "Medium" if the sound volume is smaller than 70 dB and equal to and larger than 30 dB, and is filled with "Small" if the sound volume is smaller than 30 dB.

The column for "Uttering Speed" is filled with one of "High Speed", "Medium Speed", and "Low Speed". To be specific, this column is filled with "High Speed" if the uttering speed is equal to or higher than 10 vowels/sec, is filled with "Medium Speed" if the uttering speed is lower than 10 vowels/sec and equal to or higher than 3 vowels/sec, and is filled with "Low Speed" if the uttering speed is lower than 3 vowels/sec.

The column for "Scanning Start Delay Control" is filled with either "No delay" (Immediate Start) or a delay time by which starting the scanning operation is delayed. The scanning start delay control table ST in FIG. 3 shows, as examples, four patterns from the 1st pattern to the 4th pattern, which correspond to cases where the scanning operation starts after the predetermined delay time elapses after the voice instruction for starting scanning, and the other seven patterns from the 5th pattern to the 11th pattern, which correspond to cases where the scanning operation starts immediately after the voice instruction for starting scanning. To be specific, the 1st pattern indicates a case where the scanning operation starts after the delay time of four seconds elapses, the 2nd pattern indicates a case where scanning is started after the delay time of 2 seconds elapses, the 3rd pattern indicates a case where scanning is started after the delay time of one second elapses, and the 4th pattern indicates a case where scanning is started after the delay time of 0.5 seconds elapses.

The 5th pattern of the scanning start delay control table ST indicates a case where the copy sheet cover is closed. In this case, the control section 14 instructs the scanning section 12 to start scanning immediately after the voice instruction for starting scanning is received, regardless of the other conditions.

The 6th pattern of the scanning start delay control table ST indicates a case where the user's face faces a different direction from the front direction. In this case, the control section 14 instructs the scanning section 12 to start scanning immediately after the voice instruction for starting scanning, regardless of the other conditions.

The 7th pattern of the scanning start delay control table ST indicates a case where the user is located far from the image scanning device 100. In this case, the control section 14 instructs the scanning section 12 to start scanning immediately after the voice instruction for starting scanning is received, regardless of the other conditions.

The 8th pattern of the scanning start delay control table ST indicates a case where the sound volume is small. In this case, the control section 14 instructs the scanning section 12 to start scanning immediately after the voice instruction for starting scanning is received, regardless of the other conditions.

The 9th pattern of the scanning start delay control table ST indicates a case where the uttering speed is the low speed. In this case, the control section 14 instructs the scanning section 12 to start scanning immediately after the voice instruction for starting scanning is received, regardless of the other conditions.

The 10th and 11th patterns of the scanning start delay control table ST indicate cases where the button depressing operation is performed. In these cases, the control section 14 instructs the scanning section 12 to start scanning immediately after the button operation is performed for starting scanning, regardless of the other conditions.

The scanning start delay control table ST is explained in detail using a flowchart. The scanning start delay control table ST is stored in the RAM 2 of the control section 14.

[Operation of Image Capturing Device]

Next, the scanning start delay control to be performed by the image scanning device 100 that has the configuration as above described is explained in detail using a flowchart and with reference to FIGS. 1~3.

Figure 4:
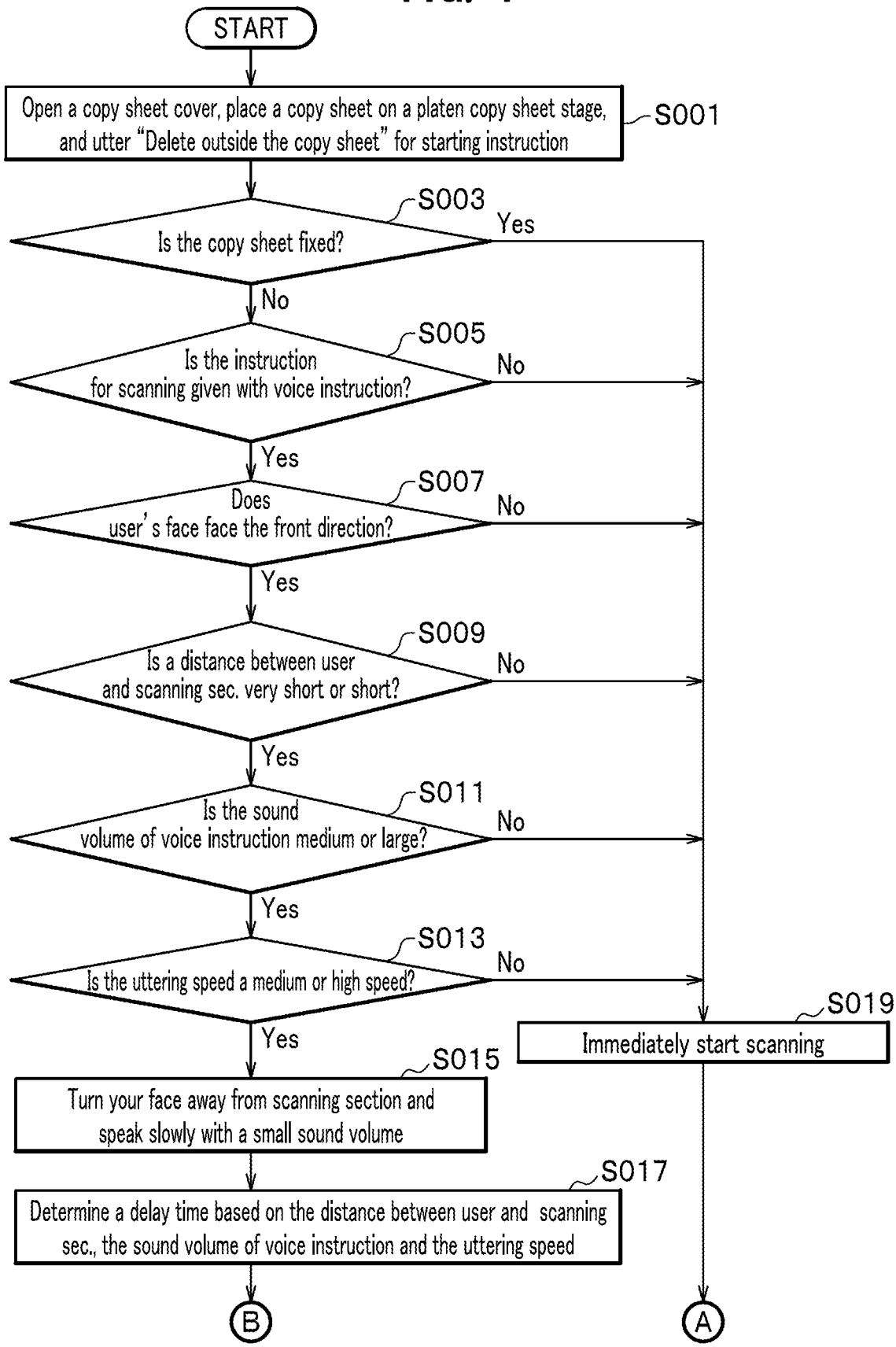
FIG. 4 is a first part of a flowchart for controlling the delay time before of the start of the scanning operation to be performed by the image scanning device of the embodiment.
Figure 5:
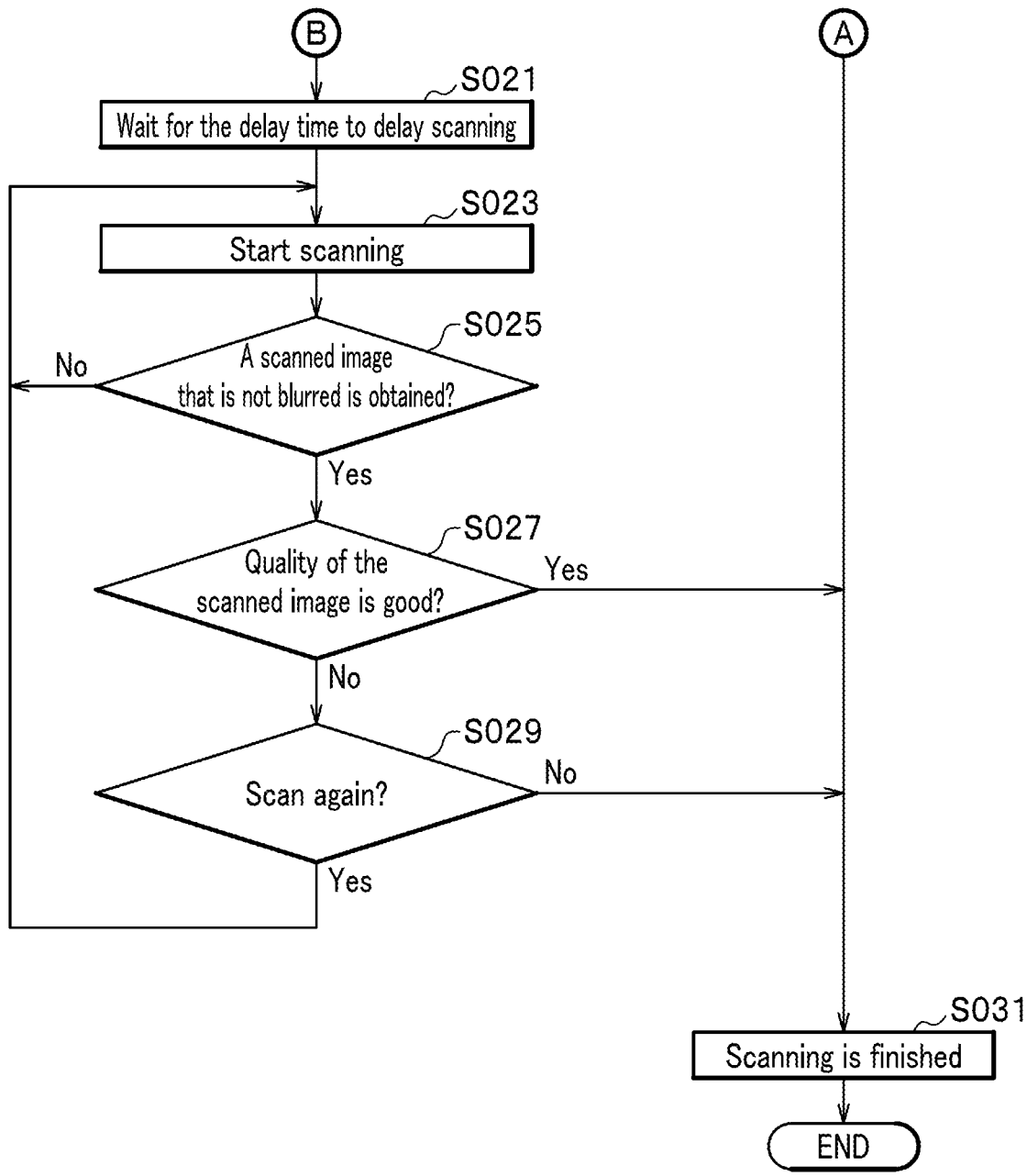
FIG. 5 is a second part of the flowchart for controlling the delay time before the start of the scanning operation to be performed by the image scanning device of the embodiment.

FIG. 4 and FIG. 5 show a flowchart indicating how the scanning start delay control is performed by the control section 14 of the image scanning device 100 of the embodiment. This embodiment to be explained is intended for a case of "Sky Shot" method where "Delete outside a copy sheet" is instructed through the voice instruction by a user with the copy sheet cover 11 left open This embodiment assumes that the control section 14 detects the scanning start instruction as soon as voice data, which the control section 14 receives from the microphone 15 on the microphone 15 receiving a voice of "Delete outside a copy sheet" uttered by a user, are converted to a character string of "DELETE OUTSIDE THE COPY SHEET". Here, "Delete outside a copy sheet" is one example. The voice instruction may be "Start scanning" or "Perform scanning". Whichever of these voice instructions is uttered by the user, the same following processes are performed.

To begin with, a user opens the copy sheet cover 11, place a copy sheet P on the platen copy sheet table 10 and utters "Delete outside the copy sheet" to instruct the image scanning device 100 to start scanning the copy sheet P (Step S001). In this case, the control section 14 of the image scanning device 100 converts the voice data for the voice that the microphone 15 has received to a character string of "DELETE OUTSIDE THE COPY SHEET". This character string is to be an instruction for starting the scanning operation.

The control section 14 determines with the open-close sensor 16 whether the copy sheet P is fixed on the platen copy sheet table 10 by the copy sheet cover 11 or not (Step S003). The control section 14 goes to Step S019 to have the scanning operation started without a delay, if the copy sheep P is fixed at the scanning section 12 (Yes in Step S003). The control section 14 goes ahead to Step S005 if the copy sheep P is not fixed at the scanning section 12 (No in Step S003).

Next, the control section 14 determines whether the instruction for the scanning operation is given with the voice instruction by a user or not in Step S005. The control section 14 goes to Step S019 to have the scanning operation started without a delay, in case the user has depressed the button for starting the scanning operation (No in Step S005). The control section 14 goes ahead to Step S007 if the user has given the instruction for staring scanning only with the voice instruction.

Next, in Step S007, the control section 14 has the camera 19 take an image of the user's face and determines whether the user's face faces the front direction in which the scanning section 12 is. The control section 14 goes to Step S019 to have the scanning operation started without a delay if the user's face does not face the front direction in which the scanning section 12 is (No in Step S007), that is, the user's face faces a different direction in which the scanning direction is not. The control section 14 goes ahead to Step S009 if the user's face faces the front direction in which the scanning section 12 is (Yes in Step S007).

Next, in Step S009, the control section 14 determines whether a distance between the user and the scanning section 12 that is detected by the distance sensor 17 is very short or short, or not. The control section 14 goes to Step S019 to have the scanning operation started without a delay if the distance between the user and the scanning section 12 is long (No in Step S009). The control section 14 goes ahead to Step S011 if the distance between the user and the scanning section 12 is very short or short (Yes in Step S009).

Next, in Step S011, the control section 14 determines whether the sound volume of the voice received by the microphone 15 is large or medium, or not (Step S011). The control section 14 goes to Step S019 to have the scanning operation started without a delay if the sound volume of the voice received by the microphone 15 is small (No in Step S011). The control section 14 goes ahead to Step S013 if the sound volume of the voice received by the microphone 15 is large or medium (Yes in Step S011).

Next, in Step S013, the control section 14 determines if the uttering speed of the user's voice instruction is a high speed or a medium speed, or not.
The control section 14 goes to Step S019 to have the scanning operation started without a delay if the uttering speed of the user's voice instruction is a low speed (No in Step S013). The control section 14 goes ahead to Step S015 if the uttering speed of the user's voice instruction is the high speed or the medium speed (Yes in Step S013).

Next, in Step S015, the control section gives the user at least one of an instruction to turn away the user's face from the front direction, an instruction to move farther away from the scanning section 12, an instruction to speak more quietly, and an instruction to speak more slowly. Thus, the user learns how to give the voice instruction when the scanning operation performed with the voice instruction.

FIGS. 6A to 6D illustrate examples of the instructions on the operation panel 13 of the image scanning device 100 by the control section 14 to the user.

Figure 6A:
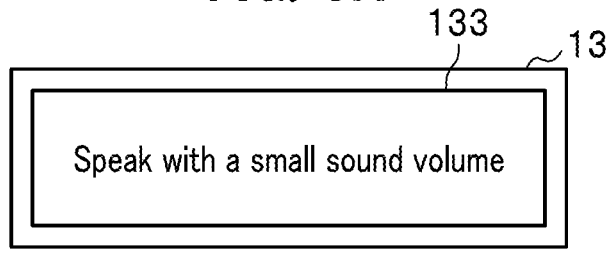
FIG. 6A shows the control section notifying a user of a first example message on an operation panel of the image scanning device.
Figure 6B:
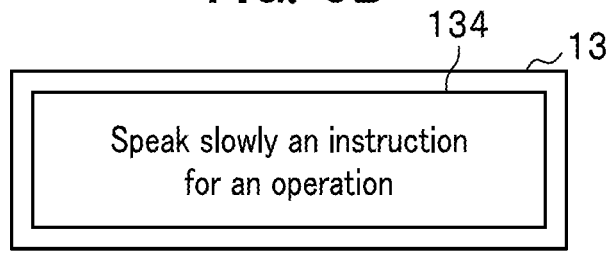
FIG. 6B shows the control section notifying a user of a second example message on the operation panel of the image scanning device.
Figure 6C:
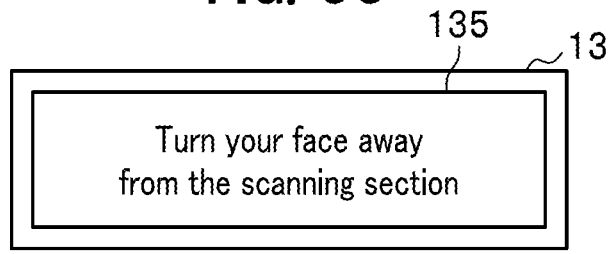
FIG. 6C shows the control section notifying a user of a third example message on the operation panel of the image scanning device.
Figure 6D:
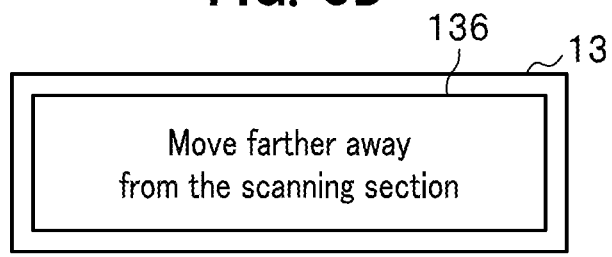
FIG. 6D shows the control section notifying a user of a fourth example message on the operation panel of the image scanning device.

FIG. 6A shows the instruction of "Speak an instruction for an operation with a small sound volume" being displayed on a display panel 133 of the operation panel 13 by the control section 14. FIG. 6B shows the instruction of "Speak slowly an instruction for an operation" being displayed on the display panel 133 of the operation panel 13 by the control section 14. FIG. 6C shows the instruction of "Turn your face away from the scanning section" being displayed on the display panel 133 of the operation panel 13 by the control section 14. FIG. 6D shows the instruction of "Move farther away from the scanning section" being displayed on the display panel 133 of the operation panel 13 by the control section 14.

The description is to be continued with reference again to FIG. 4.

Next, the control section 14 determines the delay time based on the distance between the user and the scanning section 12, the sound volume of the user's voice instruction, and the uttering speed of the user's voice instruction (Step S017).

To be specific, the control section 14 performs the scanning start delay control on the scanning section 12 based on a combination of the distance between the user and the scanning section 12, the sound volume of the user's voice instruction, and the uttering speed of the user's voice instruction.

For instance, when the voice received by the microphone 15 indicates the instruction for starting the scanning operation, the control section 14 determines the delay time after which the scanning section 12 starts the scanning operation based on the distance between the user and the scanning section 12.

For instance, the third row of the scanning start delay control table ST shown in FIG. 3 indicates a case where the distance is short, the sound volume is large and the uttering speed is high, and the delay time for delaying the start of the scanning operation is one second.

On the other hand, the fourth row of the scanning start delay control table ST shown in FIG. 3 indicates a case where the distance is very short, the sound volume is large and the uttering speed is high, and the delay time for delaying the start of the scanning operation is 0.5 seconds. That is, the difference in the delay time between the third row case and the fourth row case is caused by the difference in the distance. Based on the distance, the shorter the distance, the shorter the delay time is set.

The shorter the distance to the user, the quicker the air flow caused by the user's voice reaches the scanning section 12. The longer the distance to the user, the later the air flow caused by the user's voice reaches the scanning section 12. As a result, the control section 14 should determine the delay time after which the scanning operation is started based on the distance to user, If the voice received by the microphone 15 indicates the instruction for starting the scanning operation when the distance detected by the distance sensor 17 is less than a predetermined distance, the control section 14 instructs the scanning section 12 to start scanning after the delay time elapses, which corresponds to the distance to the user.

For instance, when the voice received by the microphone 15 indicates the instruction for starting the scanning operation, the control section 14 determines the delay time after which the scanning operation is started based on the sound volume of the user's voice.

For instance, the second row of the scanning start delay control table ST in FIG. 3 indicates the case where the copy sheet cover is not fixed, the instruction for starting the scanning operation is given with a voice instruction, the face direction is the front direction, the distance is short, and the uttering speed is high. In this case, the delay time for starting the scanning operation is set to 2 seconds.

On the other hand, the third row of the scanning start delay control table ST in FIG. 3 indicates the case where the sound volume is not medium but large and the delay time for starting the scanning operation is set to one second. That is, the difference between the second row case and the third row case lies in the sound volume, and based on the sound volume, the larger the sound volume, the shorter the delay time is set.

The larger the sound volume of the user's voice, the quicker the air flow caused by the user's voice reaches the scanning section 12. The smaller the user's voice, the later the air flow caused by the user's voice reaches the scanning section 12. Therefore, the control section 14 should determine the delay time after which the scanning operation is started based on the sound volume. If the voice instruction corresponds to the instruction for starting the scanning operation and has the sound volume larger than a predetermined value, the control section 14 instructs the scanning section 12 to start scanning after the delay time elapses, which corresponds to the sound volume of the voice instruction.

In addition, for instance, if the voice received by the microphone 15 is the instruction for starting the scanning operation, the control section 14 should determine the delay time for the scanning section 12 to start scanning based on user's uttering speed.

For instance, the first row of the scanning start delay control ST indicates the case where the uttering speed is medium and the delay time for starting the scanning operation is set to four seconds, compared with the second row case of the scanning start delay control ST. That is, the difference between the first row case and the second row case lies in the uttering speed, and based on the uttering speed, the higher the uttering speed, the shorter the delay time is set.

The higher the uttering speed of the user's instruction, the quicker the air flow caused by the user's voice instruction reaches the scanning section 12. The lower the uttering speed, the later the air flow caused by the user's voice reaches the scanning section 12. Therefore, the control section 14 should determine the delay time from the voice instruction to when the scanning operation is started based on user's uttering speed. If the voice instruction received by the microphone 15 corresponds to the instruction for starting the scanning operation and is uttered at an uttering speed that is equal to or higher than a predetermined value, the control section 14 instructs the scanning section 12 to start scanning after the delay time elapses, which corresponds to the uttering speed of the user's instruction.

The flowchart in FIG. 5 is explained.

Once the control section 14 transitions into the scanning mode, the control section 14 waits for the determined delay time, not having the scanning operation started (Step S021). In this case, the control section 14 has the light emitting section 18 (display section) emit light to notify the user of the scanning operation being delayed from when receiving the voice instruction for starting the scanning operation (for example, "Delete outside a copy sheet") to when the scanning section 12 starts the scanning operation.

The control section 14 notifies the user that the control section 14 is in the scanning mode by having the light emitting section 18 emit light. Thus, the user can recognize that the scanning start instruction has been accepted, which prevents the user from repeating the voice instruction while the control section 14 is waiting, not having the scanning operation started.

In Step S021, if the microphone 15 receives a voice instruction to stop the scanning operation while the control section 14 is waiting for the determined delay time, that is, during the time from the voice instruction for starting scanning to when the scanning section 12 starts the scanning operation, the control section 14 transitions to a mode other than the scanning mode without instructing the scanning section 12 to start scanning.

For instance, when the microphone 15 receives a voice of 'Stop scanning", the control section 14 transitions to a mode other than the scanning mode without instructing the scanning section 12 to start scanning and ends the flow chart in FIG. 4.

The control section 14 has the scanning operation started after the delayed time elapses (Step S023) and obtains the scanned image.

Next, in Step S025, the control section 14 determines whether the scanned image that has been obtained is blurred or not. If the scanned image that is obtained is blurred due to the copy sheet P having been scanned while it is moving (No in Step S025), the control section 14 goes back to Step S023 and has the scanning section 12 scan the copy sheet P again.

If the scanned image is blurred (No in Step S025), the control section 14 determines that the copy sheet P is not still and repeatedly instructs the scanning section 12 to start scanning the copy sheet P until a scanned image that is not blurred is obtained.

For instance, when the camera 19 is checking on the copy sheet P, the control section 14 may wait until the copy sheet P becomes completely still and instruct the scanning section 12 to start scanning the copy sheet P again.

If a scanned image that is not blurred is obtained (Yes in Step S025), the control section 14 goes ahead to Step S027 to determine whether quality of the obtained scanned image is good or not.

If the quality of the obtained scanned image is good (Yes in Step S027), the control section 14 goes ahead to Step S031 to store the scanned image in the storage section and ends the scanning start delay control operation as illustrated in FIG. 4 and FIG. 5.

If the obtained scanned image is not good (No in Step S027), the control section 14 asks the user if the copy sheet P should be scanned again (Step S029).

For instance, if the control section 14 determines that a rectangle of the scanned image is not in a good shape, the control section 14 determines that the quality of the scanned image is not good. To be specific, if the copy sheet P, which is a receipt, is displaced, or if the copy sheet P is displaced so much that the copy sheet is partially outside a region on the platen copy sheet table 10 over which the scanning section 12 can scan, the scanned image is determined to be not good.

If the user instructs that no further scanning should be performed, the control section 14 determines that the copy sheet P is not to be scanned again (No in Step S029), goes to Step S031 to store the scanned image in the storage section and ends the scanning start delay control operation as illustrated in FIG. 4 and FIG. 5.

If the user instructs that the copy sheet P should be scanned again, the control section 14 determines that the copy sheet P is to be scanned again (Yes in Step S019) and goes back to Step S023 to start scanning the copy sheet again.

When scanning is started without a delay in Step S019 in FIG. 4, the operation goes to Step S031 in FIG. 5 to store the scanned image in the storage section and the scanning start delay control operation as illustrated in FIG. 4 and FIG. 5 is ended.

As has been described, if the voice instruction received by the microphone 15 indicates the instruction for starting scanning, the control section 14 of the image scanning device 100 of this embodiment can instruct the scanning section 12 to start scanning after the delay time elapses after the voice instruction.

Thus, the control section 14 of the image scanning device 100 of this embodiment can instructs the scanning section 12 to start scanning at an appropriate timing that is determined taking account of the time for the air flow caused by the voice instruction to reach the copy sheet P.

Accordingly, the control section 14 of the image scanning device 100 can have the copy sheet P appropriately scanned without an influence by the air flow caused by the user's voice.

First Modified Example

The control section 14 of the image scanning device 100 of this embodiment may instructs the scanning section 12 to start scanning the copy sheet P without a delay, if the scanning start instruction is given with the operation button (For example, a touch panel 131) on the operation panel 13.

Second Modified Example

The control section 14 of the image scanning device 100 of this embodiment may calculate the delay time after which scanning is started based on a travel time for the air flow caused by the user's voice to reach the scanning section 12. In this case, the control section 14 can calculate the travel time for the air flow to reach the scanning section by dividing the distance between the user and the scanning section 12 by the uttering speed at which the user is uttering instruction words. The control section 14 may set the delay time to a summation of the transfer time and a predetermined margin.

Third Modified Example

The camera 19 of the image scanning device 100 of this embodiment takes an image of a user's face and may extract a mouth of the user to detect when the user's mouth closes. In this case, the control section 14 detects a timing when the user's mouth closes after the voice for starting scanning is uttered. Then, measuring a delay time to be selected from the scanning start delay control table ST shown in FIG. 3 is started from the timing and scanning may be started after the delay time elapses.

What is claimed is:

1. An image scanning device, comprising;
    a voice receiving section configured to receive a voice;
    an image scanning section configured to scan an image; and
    a control section configured to instruct the image scanning section to start scanning after a delay time elapses after the voice, if the control section determines that the voice received by the voice receiving section corresponds to an instruction for starting scanning.

2. The image scanning device as claimed in claim 1, further comprising:
    a determining section configured to determine whether a copy sheet is fixed on the image scanning section,
    wherein, if the control section determines that the voice received by the voice receiving section corresponds to the instruction for starting scanning and the determining section determines that the copy sheet is fixed on the image scanning section, the control section immediately instructs the image scanning section to start scanning.

3. The image scanning device as claimed in claim 1, further comprising:
    an imaging section configured to take an image of a user operating the image scanning device,
    wherein, if the control section determines that a user's face does not face the image scanning section based on the image taken by the imaging section of the user and that the voice received by the voice receiving section corresponds to the instruction for starting scanning, the control section immediately instructs the image scanning section to start scanning.

4. The image scanning device as claimed in claim 1, further comprising:
    a distance sensor configured to detect a distance to the user who is operating the image scanning device,
    wherein, if the control section determines that the distance to the user is equal to or longer than a predetermined distance and that the voice received by the voice receiving section corresponds to the instruction for starting scanning, the control section immediately instructs the image scanning section to start scanning.

5. The image scanning device as claimed in claim 4, wherein, if the control section determines that the distance to the user is shorter than the predetermined distance and that the voice received by the voice receiving section corresponds to the instruction for starting scanning, the control section instructs the image scanning section to start scanning after a delay time that corresponds to the distance to the user elapses.

6. The image scanning device as claimed in claim 1, wherein, if the control section determines that a sound volume of the voice received by the voice receiving section is equal to or smaller than a predetermined value and that the voice received by the voice receiving section corresponds to the instruction for starting scanning, the control section immediately instructs the image scanning section to start scanning.

7. The image scanning device as claimed in claim 1, wherein, if the control section determines that an uttering speed of the voice by a user is equal to or lower than a predetermined value and that the voice received by the voice receiving section corresponds to the instruction for starting scanning, the control section immediately instructs the image scanning section to start scanning.

8. The image scanning device as claimed in claim 1, wherein, if the control section determines that the voice received by the voice receiving section corresponds to the instruction for starting scanning, the control section determines the delay time after which scanning is started based on the sound volume of the voice.

9. The image scanning device as claimed in claim 1, wherein, if the control section determines that the voice received by the voice receiving section corresponds to the instruction for starting scanning, the control section determines the delay time after which scanning is started based on the uttering speed of the voice uttered by the user.

10. The image scanning device as claimed in claim 1 further comprising:
    a display section,
    wherein the control section notifies the user with display section that scanning is being delayed during a time from the voice for instructing that scanning should be started to when the image scanning section starts scanning.

11. The image scanning device as claimed in claim 1, wherein, if the control section determines that the voice receiving section receives a voice for instructing that scanning should stop during a time from the voice for instructing that scanning should be started to when the image scanning section starts scanning, the control section does not instruct the image scanning section to start scanning.

12. The image scanning device as claimed in claim 1, wherein the control section instructs the image scanning section to scan again if the control section determines that a scanned image is blurred when the image scanning section performs scanning after the delayed time elapses after the voice for instructing that scanning should be started.

13. The image scanning device as claimed in claim 1, wherein the control section asks a user if scanning is performed again, if the control section determines that quality of a scanned image is not good when the image scanning section performs scanning after the delayed time elapses after the voice for instructing that scanning should be started.

14. The image scanning device as claimed in claim 2, wherein the control section asks a user to lower a sound volume of the voice uttered by the user, if the determining section determines that the copy sheet is not fixed when the voice receiving section receives the voice uttered by the user.

15. The image scanning device as claimed in claim 2, wherein the control section asks a user to lower an uttering speed, if the determining section determines that the copy sheet is not fixed when the voice receiving section receives the voice uttered by the user.

16. The image scanning device as claimed in claim 2, wherein the control section asks a user to turn away a user's face from the image scanning section, if the determining section determines that the copy sheet is not fixed when the voice receiving section receives the voice uttered by the user.

17. The image scanning device as claimed in claim 2, wherein the control section asks a user to move farther away from the image scanning section, if the determining section determines that the copy sheet is not fixed when the voice receiving section receives the voice uttered by the user.

18. The image scanning device as claimed in claim 1, wherein, if an instruction for starting scanning is given with an operation button, the control section immediately instructs the image scanning section to start scanning.

* * * * *